US012681788B2

(12) United States Patent
Shintani et al.

(10) Patent No.: US 12,681,788 B2
(45) Date of Patent: Jul. 14, 2026

(54) FAILURE PROBABILITY EVALUATION DEVICE AND FAILURE PROBABILITY EVALUATION METHOD

(71) Applicant: Hitachi, Ltd., Tokyo (JP)

(72) Inventors: Hiroshi Shintani, Tokyo (JP); Hisashi Tanie, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1029 days.

(21) Appl. No.: 17/636,311

(22) PCT Filed: Feb. 7, 2020

(86) PCT No.: PCT/JP2020/004964
§ 371 (c)(1),
(2) Date: Feb. 17, 2022

(87) PCT Pub. No.: WO2021/049060
PCT Pub. Date: Mar. 18, 2021

(65) Prior Publication Data
US 2022/0283889 A1 Sep. 8, 2022

(30) Foreign Application Priority Data

Sep. 11, 2019 (JP) ................................. 2019-165083

(51) Int. Cl.
| | |
|---|---|
| *G06F 11/07* | (2006.01) |
| *G01M 5/00* | (2006.01) |
| *G05B 23/02* | (2006.01) |

(52) U.S. Cl.
CPC ....... *G06F 11/0754* (2013.01); *G01M 5/0016* (2013.01); *G01M 5/0033* (2013.01);
(Continued)

(58) Field of Classification Search
None
See application file for complete search history.

(56) References Cited

U.S. PATENT DOCUMENTS 8,200,442 B2 * 6/2012 Adams ................... G06Q 10/20
702/34
2009/0248387 A1 10/2009 Singhee et al.
(Continued)

FOREIGN PATENT DOCUMENTS

| JP | 2003-108756 A | 4/2003 |
|---|---|---|
| JP | 2006-277370 A | 10/2006 |

(Continued)

OTHER PUBLICATIONS

Larson, et al., "Gaussian-Pareto overbounding of DGNSS pseudoranges from CORS" Journal of the Institute of Navigation, Mar. 10, 2019, vol. 66, pp. 139-150, DOI:10.1002/navi.276.

(Continued)

*Primary Examiner* — Juan G Flores
(74) *Attorney, Agent, or Firm* — Foley & Lardner LLP

(57) ABSTRACT

A failure probability evaluation device for a mechanical system includes one or more memory devices having a program stored thereon. When executed by one or more processors, the program causes the one or more processors to store a failure model that computes the failure probability of the mechanical system, and an occurrence frequency distribution of a probability variable. The one or more processors estimates a probability density function of an end portion of the occurrence frequency distribution, estimates a probability density function of a portion other than the end portion of the occurrence frequency distribution, and uses the probability density function of the end portion and the probability density function of the portion other than the end portion to estimate an entire probability density function. The one or more processors computes the failure probability of the mechanical system based on the entire probability density function and the failure model.

8 Claims, 9 Drawing Sheets

(52) U.S. Cl.
     CPC ....... *G01M 5/0041* (2013.01); *G05B 23/0283*
                 (2013.01); *G06F 11/0736* (2013.01)

(56)                    References Cited

U.S. PATENT DOCUMENTS

| | | | |
|---|---|---|---|
| 2010/0235108 A1* | 9/2010 | Adams ..................... | B64F 5/60 |
| | | | 702/179 |
| 2011/0025558 A1 | 2/2011 | Levy | |
| 2014/0149325 A1* | 5/2014 | Clifton ................ | G05B 23/024 |
| | | | 706/12 |
| 2018/0032598 A1 | 2/2018 | Senger et al. | |

FOREIGN PATENT DOCUMENTS

| | | |
|---|---|---|
| JP | 2007-113967 A | 5/2007 |
| JP | 2011-517770 A | 6/2011 |
| JP | 2015-203906 A | 11/2015 |
| JP | 2018-185171 A | 11/2018 |

OTHER PUBLICATIONS

Yamada, et al., "A Study of Parameter Estimation of False Accept Rate for Biometric Performance Evaluation", The Institute of Electronics Information and Communication Engineers, IEICE technical report, 2017, 7 pages.
International Search Report with English translation and Written Opinion issued in corresponding application No. PCT/JP2020/004964 dated Apr. 7, 2020.

* cited by examiner

FIG. 2

CUMULATIVE DAMAGE OR FATIGUE STRENGTH

FAILURE PROBABILITY EVALUATION DEVICE AND FAILURE PROBABILITY EVALUATION METHOD

TECHNICAL FIELD

The present invention relates to a failure probability evaluation device and a failure probability evaluation method that evaluate a failure probability of a mechanical system using a probability density function estimated from measurement data.

BACKGROUND ART

For example, with increases in sizes and complexity of mechanical systems such as wind power generators and construction machines, the effect of a failure of a mechanical system failure is increasing. To keep, within an acceptable range, the risk (product of a failure probability and an effect) that a failure of a mechanical system affects surroundings of the mechanical system, it is important to accurately evaluate the probability of a future failure of the mechanical system and take appropriate measures such as maintenance work and replacement of a part at an appropriate time in both the design stage of the mechanical system and the operation and maintenance stage of the mechanical system. For accurate evaluation of the failure probability, it is effective to use measurement data to accurately estimate a probability density function to be used to calculate the failure probability.

The measurement data corresponds to actual measurement data that is, for example, a wind speed when the mechanical system is a wind power generator, and relates to an environment in which the mechanical system operates. In addition, the measurement data also includes actual measurement data such as strain relating to the operational state of the mechanical system, directly measurable physical quantities such as yield stress and strength data obtained by material testing and sampling inspection, simulation data obtained by computer simulation based on data that is, for example, stress or the like and relates to an environment in which the mechanical system operates, and data on the operational state of the mechanical system. The measurement data also includes a physical quantity that can be indirectly estimated from a physical quantity that can be directly measured.

As a technique for evaluating a failure probability of a mechanical system by using such measurement data, for example, there is a technique described in Patent Literature 1. In claim 1 of Patent Literature 1, a "reliability evaluation method for a structure that has deteriorated over time is disclosed, which includes estimating a probability density function of each of characteristic variables based on survey data on an actual condition of the structure that has deteriorated over time and survey data of a questionnaire to an expert; calculating, from a probability density of each of the characteristic variables, a relative likelihood of each of combinations of values of the characteristic variables; estimating a probability density function from a frequency distribution of generated stress that has been obtained by using the relative likelihood of each of the combinations to convert a frequency distribution of generated stress that has been obtained by finite element analysis performed for each of the combinations; and calculating a destruction probability and a safety index based on the probability density function of the generated stress and a probability density function of strength set from existing data".

CITATION LIST

Patent Literature

[Patent Literature 1] Japanese Patent Application Laid-Open No. 2007-113967

SUMMARY OF INVENTION

Technical Problem

A mechanical system failure occurs when stress generated in a mechanical system exceeds the strength of the mechanical system. The failure probability is mathematically obtained by performing multiple integration using a probability density function $f_S$ of stress S and a probability density function $f_R$ of strength R and calculating the probability that the stress S exceeds the strength R. By the way, as illustrated in FIG. 6 of Patent Document 1, a mechanical system with high reliability and a low failure probability is designed such that the stress S is sufficiently lower than the strength R. Therefore, in the above-mentioned multiple integration, a neighborhood of a region where a right end portion of the probability density function $f_S$ of the stress S and a left end portion of the probability density function $f_R$ of the strength R intersect each other most contributes to the probability that the stress S exceeds the strength R. Therefore, accurately estimating an end portion of a probability density function of stress and strength or an end portion of a probability density function of a physical quantity that is, for example, a load and relates to the stress S or the strength R is important to improve the accuracy of evaluating a failure probability.

A complex and instantaneous high load, such as a wind load in a wind power generator, may be applied to an actual mechanical system. In addition, when the load increases, the mechanical system itself may exhibit a complex nonlinear behavior. Therefore, there is no guarantee that the stress S (central portion of the frequency distribution of generated stress) of the order that occurs most frequently and high stress (right end portion of the frequency distribution of the generated stress) that occurs rarely follow the same probability distribution. However, in Patent Literature 1, an entire frequency distribution of generated stress is estimated using a single probability density function. Therefore, when a central portion and an end portion of a frequency distribution of generated stress do not follow the same probability distribution, there is a problem that a probability density function that fits the central portion at which stress frequently occurs is selected and the accuracy of estimating the end portion is reduced.

The present invention has been made in view of such circumstances and an object of the present invention is to provide a failure probability evaluation method and a failure probability evaluation method that improve the accuracy of evaluating a failure probability by accurately estimating a probability density function of an end portion even when a central portion and the end portion of a frequency distribution of stress and strength or of a physical quantity that is, for example, a load related to stress and strength do not follow the same probability distribution.

Solution to Problems

A failure probability evaluation device according to the present invention evaluates a failure probability of a mechanical system and includes a storage unit that stores a failure model that computes the failure probability of the mechanical system and an occurrence frequency distribution of a probability variable to be used for the failure model; a probability density function estimating unit including an end portion estimating unit that estimates a probability density function of an end portion of the occurrence frequency distribution based on an extreme value statistical model, a central portion estimating unit that estimates a probability density function of a portion other than the end portion of the occurrence frequency distribution, and a connecting unit that uses the probability density function of the end portion and the probability density function of the portion other than the end portion to estimate an entire probability density function of the occurrence frequency distribution; and a failure probability computing unit that computes the failure probability of the mechanical system based on the entire probability density function and the failure model.

A failure probability evaluation method according to the present invention includes a step of estimating, based on an extreme value model, a probability density function of an end portion of an occurrence frequency distribution of a probability variable to be used for a failure model that computes a failure probability of a mechanical system; a step of estimating a probability density function of a portion other than the end portion of the occurrence frequency distribution; a step of using the probability density function of the end portion and the probability density function of the portion other than the end portion to estimate an entire probability density function of the occurrence frequency distribution; and a step of computing the failure probability of the mechanical system based on the entire probability density function and the failure model.

Advantageous Effects of Invention

According to the present invention, it is possible to provide a highly accurate failure probability evaluation device that can accurately estimate an end portion of a probability density function of stress and strength or an end portion of a probability density function of a physical quantity that is, for example, a load, related to stress and strength. Problems, configurations, and effects other than the aforementioned problems, configurations, and effects are clarified by the following description of an embodiment.

BRIEF DESCRIPTION OF DRAWINGS

FIG. 2 is a functional block diagram of the failure probability evaluation device illustrated in FIG. 1.

DESCRIPTION OF EMBODIMENTS

Hereinafter, a failure probability evaluation device according to an embodiment of the present invention is described with reference to FIGS. 1 to 7. In the embodiment, a wind power generation plant is exemplified as a specific example of a mechanical system, but the mechanical system applied in the present invention is not limited to the wind power generation plant.

Figure 1:
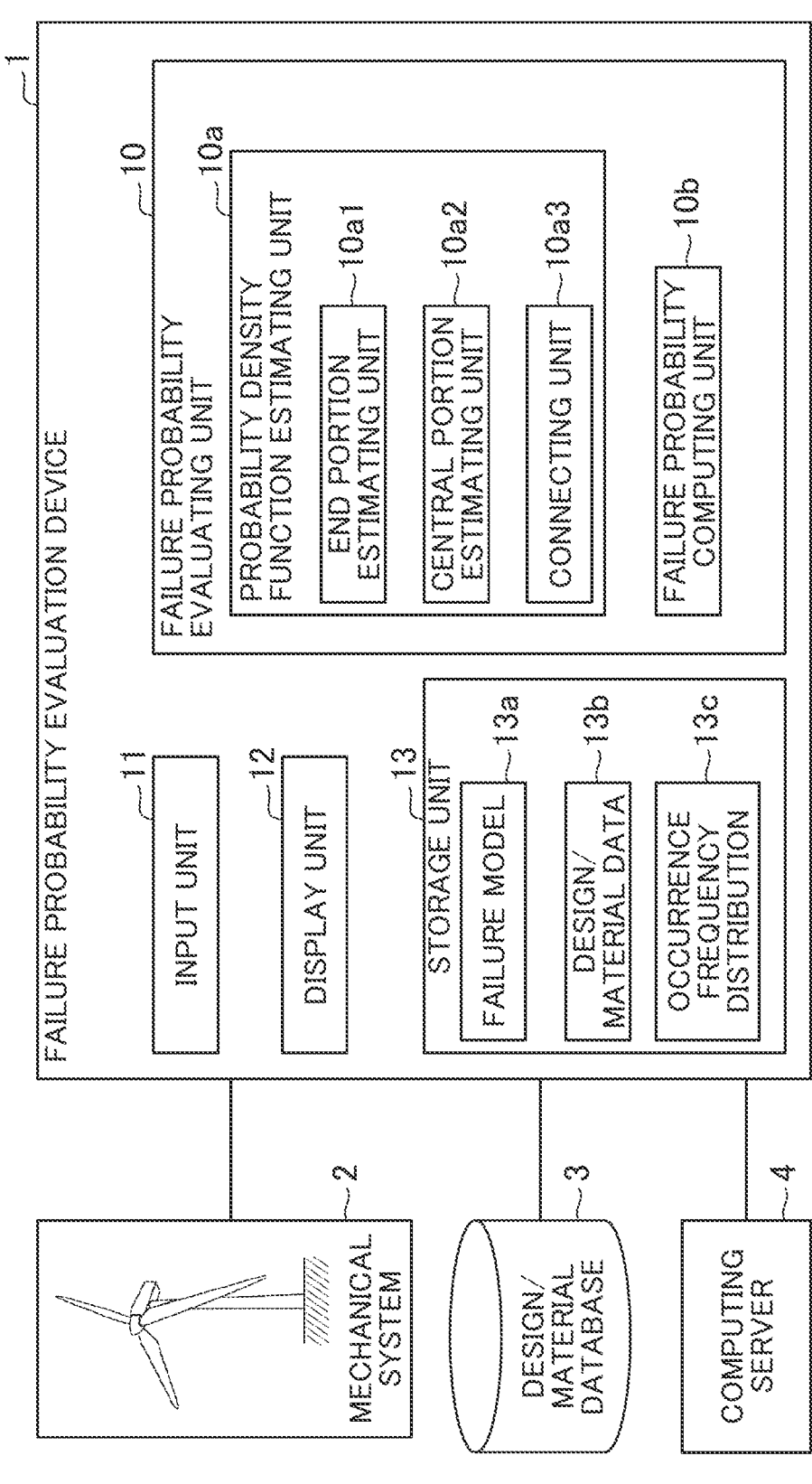
FIG. 1 is an entire schematic configuration diagram of a failure probability evaluation device according to an embodiment.

FIG. 1 is an entire schematic configuration diagram of a failure probability evaluation device 1 according to the embodiment. As illustrated in FIG. 1, the failure probability evaluation device 1 is connected to a mechanical system 2, a design/material database 3, and a computing server 4 via a signal line and a network such as the Internet or an intranet and can transmit and receive data to and from the mechanical system 2, the design/material database 3, and the computing server 4.

In the mechanism system 2, many sensors that measure a usage environment and an operational state are implemented. Measurement data such as environmental data and operational data measured by the sensors is transmitted to the failure probability evaluation device 1 and is used to evaluate a failure probability. In this case, the environmental data includes data relating to an environment to which the mechanical system 2 is exposed. When the mechanical system 2 is a wind power generation plant, wind data such as the speed and direction of a wind flowing to a windmill is included in the environmental data. When the wind power generation plant is installed on the ocean, the wind data and ocean data such as the length and height of a wave are included in the environmental data. In addition, the operational data is data that relates to an operational state of the mechanical system 2 and is a speed, acceleration, a rotational speed, a rotational angle, and the like. When the mechanical system 2 is the wind power generation plant, the amount of power generated by the windmill, the rotational speed, azimuth, nacelle angle and the like of a power generator are included in the operational data. In the plant, the environmental data and the operational data are measured as control measurement (SCADA, Supervisory Control And Data Acquisition) in many cases. However, when the plant includes state monitoring (CMS, Condition Monitoring System) and structure monitoring (SHM, Structural Health Monitoring), and, for example, data measured by them, such as strain, related to the usage environment and operational state of the mechanical system 2, such data is included in the environmental data and the operational data in the embodiment.

Data of the design/material database 3 is also transmitted to the failure probability evaluation device 1 and used for the evaluation. When the mechanical system 2 is the wind power generation plant, the design data includes data that is, for example, a drawing of the wind power generator and the like and relates to the shape of the mechanical system 2, or wind speed/wind direction data obtained from wind surveys and the Japan Meteorological Agency database. In addition, the material data includes characteristics of materials used in the wind power generator and characteristics of structures such as bolt joints and welded joints.

The computing server 4 receives, from the failure probability evaluation device 1, the environmental data and the operational data transmitted from the mechanical system 2 to the failure probability evaluation device 1 or a part of various data transmitted from the design/material database to the failure probability evaluation device 1 and calculates a physical quantity requested by the failure probability evaluation device 1 based on the received data. After the calculation, the computing server 4 returns the data to the failure probability evaluation device 1. When the mechanical system 2 is the wind power generation plant, the computing server 4 calculates stress and a moment that have occurred in each constituent member of the wind power plant from the environmental data such as the wind speed and strain, the operational data, and design/material data such as an aerodynamic model. The computing server 4 may not be necessarily independent of the failure probability evaluation device 1 and may be integrated with the failure probability evaluation device 1.

The failure probability evaluation device 1 is a device that coordinates with the design/material database 3 and the calculation server 4 to evaluate a failure probability of the mechanical system 2. The failure probability evaluation device 1 includes a failure probability evaluating unit 10, an input unit 11, a display unit 12, and a storage unit 13. The failure probability evaluating unit 10 includes a probability density function estimating unit 10a and a failure probability computing unit 10b. The probability density function estimating unit 10a includes an end portion estimating unit 10a1, a central portion estimating unit 10a2, and a connecting unit 10a3. The input unit 11 is, for example, an input device such as a keyboard or a mouse and is used by a user to give some input to the failure probability evaluation device 1. The display unit 12 is, for example, a display device such as a liquid crystal display (LCD) or an organic EL display and a print output device such as a printer and displays the process and result of processing by the failure probability evaluating unit 10 or a screen for interactive processing for the user of the failure probability evaluation device 1. The storage unit 13 stores data of a failure model 13a, design/material data 13b, and data of an occurrence frequency distribution 13c.

Figure 2:
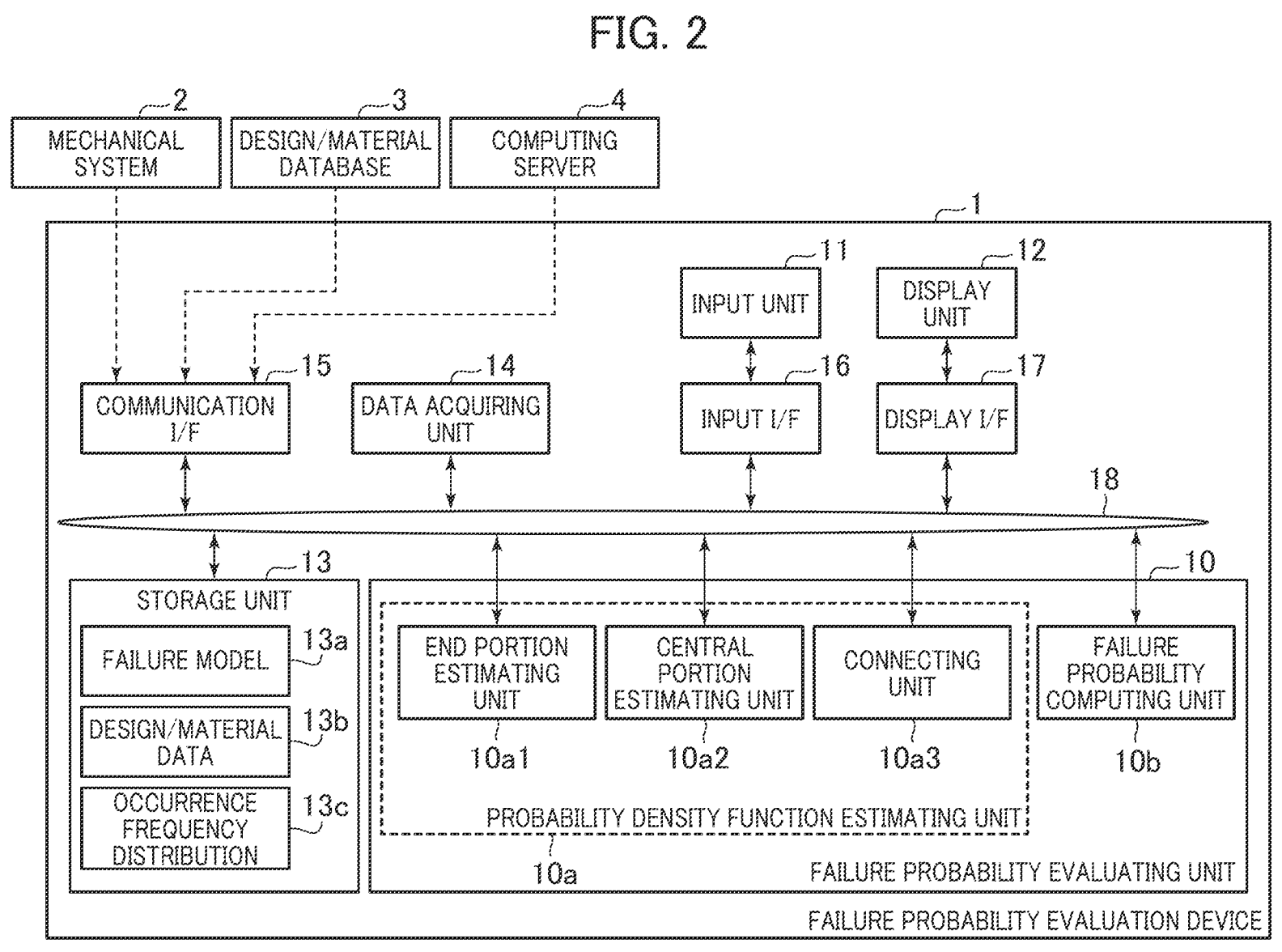

FIG. 2 is a functional block diagram of the failure probability evaluation device 1 illustrated in FIG. 1. As illustrated in FIG. 2, the failure probability evaluation device 1 has the configuration illustrated in FIG. 1 and includes a data acquiring unit 14, a communication I/F 15, an input I/F 16, and a display I/F 17, which are connected to each other via an internal bus 18 and can be accessed by each other via the internal bus 18. The communication I/F 15 receives data transmitted from the mechanical system 2, the design/material database 3, and the computing server 4. In addition, the input I/F 16 is connected to the input unit 11. The display I/F 17 is connected to the display unit 12. In the following description, when the intervention of the internal bus 18, the communication I/F 15, the input I/F 16, the display I/F 17, and the like for data transmission and reception is obvious, the intervention is omitted as appropriate.

The failure probability evaluation device 1 is actually constituted by a computer such as a personal computer. The failure probability evaluating unit 10, the storage unit 13, and the data acquiring unit 14 illustrated in FIG. 2 are, for example, implemented as a processor such as a CPU (central processing unit) not illustrated, a ROM storing various programs, a RAM for temporarily storing data being computed, and a storage device such as an external storage device. The processor such as a CPU reads and executes various programs stored in the ROM and causes computation results, which are results of the execution, to be stored in the RAM or the external storage device.

The storage unit 13 stores, in a predetermined storage region, the failure model 13a and the design/material data 13b for determining whether the state of the mechanical system 2 input by a user via the input unit 11 and the input I/F 16 or via the design/material database 3 and the communication I/F 15 is a healthy state or a failure state.

The data acquiring unit 14 acquires various measurement data from the mechanical system 2 and performs, for example, an A/D conversion process, a smoothing process (noise removal), or a normalization process. In addition, since the acquiring unit 14 acquires measurement data to be used for the failure model 13a, the data acquiring unit 14 performs various processes on the measurement data of the mechanical system 2, transmits the data to the computing server 4, and receives a calculation result.

The failure model 13a includes a probability variable for considering various uncertainty relating to a usage environment and an operational state of the mechanical system 2. For example, when the mechanical system 2 is the wind power generation plant, the probability variable is a wind speed, the strength of each constituent member of the wind power generation plant, or the like. In addition, the probability variable is not limited to a directly measurable physical quantity such as strain or a wind speed and may be a physical quantity such as stress indirectly estimated from the directly measurable physical quantity. The failure model 13a may include a variable with a definite value in addition to the probability variable. For example, a variable with small uncertainty such as a plate thickness or mass of a structure can be embedded as a definite value in the design/material data 13b.

The failure model 13a is, for example, a limit state formula G $(X_1, X_2, \ldots, X_n)$. In this case, X is a probability variable. When G>0, it is determined that the mechanical system 2 is healthy. When G<0, it is determined that the mechanical system 2 has a failure. For example, the simplest limit state formula G is G(S, R)=R−S (S is stress and R is strength). In addition to the probability variable, the variable of the design/material data 13b may be embedded as a definite value in the limit state formula G. A limit state formula G can be defined for each constituent part of the mechanical system. In this case, a plurality of failure models 13a is stored in the storage unit 13.

Among probability variables in the failure model 13a, a probability variable that indicates strength of each constituent member of the wind power generation plant or the like and for which a probability density function is calculated in material testing in advance is stored as the design/material data 13b in a predetermined storage region in the storage unit 13. On the other hand, a probability density function f is not calculated for various data acquired by the data acquiring unit 14 from the mechanical system 2 and the computing server 4 before the mechanical system 2 operates. Therefore, the storage unit 13 acquires, from the data acquiring unit 14, measurement data for which a probability density function f is not calculated, and stores an occurrence frequency distribution 13c of each data item in a predetermined storage region. For a probability variable for which a probability density function f is stored as design/material data 13b, when measurement data used to estimate the probability density function f can be obtained, the measurement data may be stored in the occurrence frequency distribution 13c.

The end portion estimating unit 10*a*1, the central portion estimating unit 10*a*2, and the connecting unit 10*a*3 that constitute the probability density function estimating unit 10*a* refer to the occurrence frequency distribution 13*c* of the various measurement data acquired from the storage unit 13 and estimate the probability density function f. First, the end portion estimating unit 10*a*1 checks either one or both of a right end portion and a left end portion of the occurrence frequency distribution 13*c* and determines a range that a probability density function $f_B$ of an end portion fits. When the end portion is the right end portion, the range that the probability density function $f_B$ of the end portion fits is a range equal to and higher than a threshold $th_R$ determined by the end portion estimating unit 10*a*1. When the end portion is the left end portion, the range that the probability density function $f_B$ of the end portion fits is a range equal to and lower than a threshold $th_L$, determined by the end portion estimating unit 10*a*1. The end portion estimating unit 10*a*1 transmits the determined threshold value to the central estimating unit 10*a*2 and transmits, to the connection portion 10*a*3, the determined threshold value and information of the probability density function $f_B$ that fits the estimated end portion.

The central portion estimating unit 10*a*2 estimates, based on the threshold acquired from the end portion estimating unit 10*a*1, a probability density function $f_C$ that fits the occurrence frequency distribution 13*c* in a region other than the end portions. When only the threshold $th_R$ for the right end portion is obtained from the end portion estimating unit 10*a*1, the region of the occurrence frequency distribution 13*c* that is to be evaluated by the central portion estimating unit 10*a*2 is a range equal to and lower than the threshold $th_R$. When only the threshold $th_L$, for the left end portion is obtained from the end portion estimating unit 10*a*1, the region of the occurrence frequency distribution 13*c* that is to be evaluated by the central portion estimating unit 10*a*2 is a range equal to and higher than the threshold $th_L$. When both of the thresholds $th_R$ and $th_L$, for the right and left end portions are obtained from the end portion estimating unit 10*a*1, the region of the occurrence frequency distribution 13*c* that is to be evaluated by the central portion estimating unit 10*a*2 is a range from an upper limit to a lower limit. The upper limit and the lower limit are the two thresholds. The central portion estimating unit 10*a*2 transmits, to the connecting unit 10*a*3, information of the probability density function $f_C$ that fits the estimated central portion.

The connecting unit 10*a*3 acquires, from the end portion estimating unit 10*a*1, the probability density function $f_B$ that fits the threshold and the end portion. In addition, the connecting unit 10*a*3 acquires, from the central portion estimating unit 10*a*2, the probability density function $f_C$ that fits the central portion. Then, the connecting unit 10*a*3 finely adjusts the shape of a probability density function $f_J$ in the vicinity of the thresholds to smoothly connect the probability density function $f_B$ for the end portion to the probability density function $f_C$ for the central portion in the vicinity of the thresholds so as to estimate the probability density function f that fits the entire region of the occurrence frequency distribution 13*c*.

The probability density function may not necessarily be estimated using the end portion estimating unit 10*a*1, the central portion estimating unit 10*a*2, and the connecting unit 10*a*3 for all data stored in the occurrence frequency distribution 13*c*. That is, when the measurement data can be expressed with one probability density function with physical validity, the probability density function estimating unit 10*a* estimates the probability density function that fits the entire region of the measurement data in a similar manner to a conventional technique. For example, regarding the tensile strength of a brittle material, the microscopically weakest part is the starting point of destruction (weakest link theory), and thus a Weibull distribution of three parameters fits, regardless of the magnitude of measurement data. In addition, tensile strength and yield stress of a metal material are considered to be average values of characteristics of a microscopic element constituting the material, and thus these physical quantities follow a normal distribution according to the central limit theorem. The number of data items of strength data is generally small due to experimental cost and time constraints. Therefore, to improve the accuracy of estimating the probability density function, it is more desirable to estimate entire data using one parametric probability density function (normal distribution, logarithmic normal distribution, Weibull distribution, or the like) than the case where the measurement data is divided and estimated using a plurality of probability density functions. On the other hand, regarding a physical quantity that is a load or stress and relates to a load, there is no guarantee that a load (central portion of an occurrence frequency distribution) of order that most frequently occurs and a high load (right end portion of the occurrence frequency distribution) that rarely occurs do not follow the same probability distribution, the number of measurable data items is large compared to strength data, and thus it is desirable to estimate an end portion and a central portion using different probability density functions.

In addition, the failure probability computing unit 10*b* acquires, from the design/material data 13*b*, a variable of a definite value to be used for the failure model 13*a*, and acquires, from the probability density function estimating unit 10*a* or probability density functions stored in the design/material data 13*b*, a probability density function f of a probability variable to be used for the failure model 13*a*. A method for computing a failure probability from the above-mentioned variable and the probability variable is defined in the failure model 13*a*, and the failure probability computing unit 10*b* calculates a failure probability according to the computation method.

For example, when the failure model 13*a* is given as the limit state formula G $(X_1, X_2, \ldots, X_n)$, a failure probability $P_f$ is given according to Equation (1) using a simultaneous probability density function f $(X_1, X_2, \ldots, X_n)$ of $X_1$, $X_2, \ldots, X_n$.

$$P_f = \iint_{G(X) \le 0} \cdots \int f(X_1, X_2, \ldots, X_n) dX_1 dX_2 \ldots dX_n \qquad \text{Equation (1)}$$

Equation (1) can be evaluated using Monte Carlo simulation or the like. In addition, since the calculation cost for multiple integration of Equation (1) is reduced, the failure probability $P_f$ may be calculated using a primary reliability theory or a secondary reliability theory that is known as a method for giving an approximate solution of Equation (1). For example, when G(S, R)=R−S in Equation (1) (S is stress and R is strength), a failure probability when the mechanical system 2 has a static failure due to excessive stress applied once is calculated.

The display unit 12 acquires the failure probability $P_f$ calculated by the failure probability evaluating unit 10 and displays the failure probability $P_f$ on the display screen of the display device constituting the display unit 12. Therefore, the user of the failure probability evaluation device 1 can easily visually recognize the risk of the mechanical system 2. Details of the display screen of the display unit 12 are described later.

<Method for Estimating Static Failure Probability>

Figure 3A:
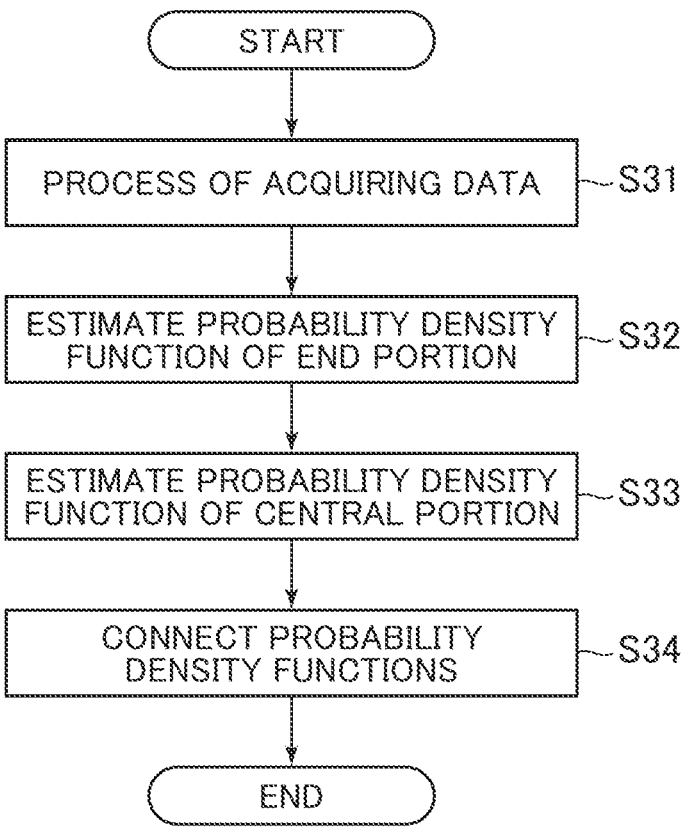
FIG. 3A is a flowchart of the estimation of a probability density function by the failure probability evaluation device illustrated in FIG. 1.

FIG. 3A is a flowchart illustrating details of data processing by the probability density function estimating unit 10*a* of the failure probability evaluation device 1. In this case, a procedure for estimating the probability density function $f_B$ for the right end portion of the probability density function f by the end portion estimating unit 10*a*1 is exemplified.

Figure 3B:
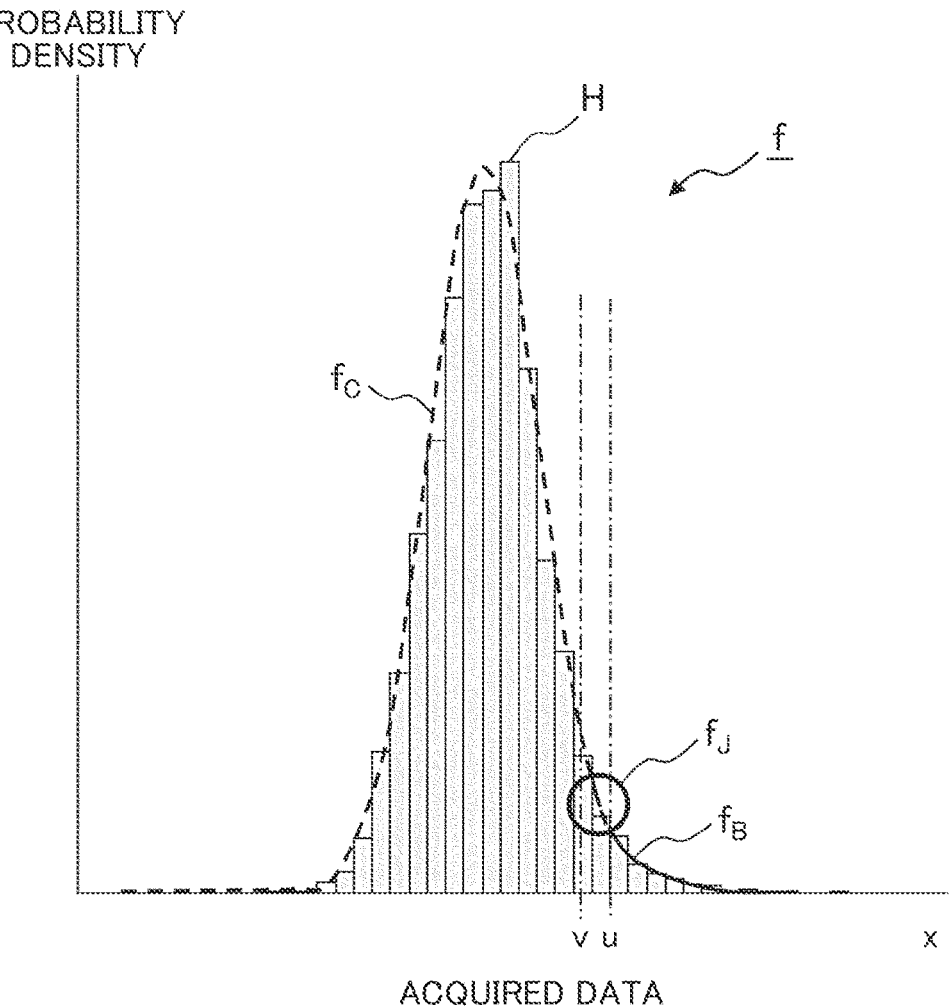
FIG. 3B is a schematic diagram illustrating the relationship between an occurrence frequency distribution of acquired data and the estimated probability density function.

First, in step S31, the end portion estimating unit 10*a*1 acquires the occurrence frequency distribution 13*c* of the measurement data from the storage unit 13. A histogram H illustrated in FIG. 3B is an example of specific details of the occurrence frequency distribution 13*c*.

Next, in step S32, the end portion estimating unit 10*a*1 estimates, based on an extreme value statistical model, the probability density function $f_B$ that fits the right end portion of the histogram H of the measurement data in a region equal to and higher than a threshold u. In this case, as the extreme value statistical model, a peak over threshold method (POT method) is used. When the threshold u is sufficiently high, the probability density function $f_B$ for the right end portion is expressed in the region equal to and higher than the threshold u using the following Formula (2) as a probability density function obtained by deforming a general Pareto distribution, regardless of the functional form of the probability distribution that the measured data follows.

$$\frac{1-F(u)}{\sigma}\left(1+\xi\frac{X-u}{\sigma}\right)^{\frac{\xi+1}{\xi}} \qquad \text{Equation (2)}$$

F is a cumulative distribution function of the measurement data, $\sigma$ is a scale parameter, and $\xi$ is a shape parameter (extreme value index). In Equation (2), $1-F(u)$ can be estimated using the ratio of the number of measurement data items exceeding the threshold u to the number of all data items in the histogram H. In addition, the scale parameter $\sigma$ and the shape parameter $\xi$ can be estimated by maximum likelihood estimation. A method for determining an appropriate threshold u using the POT method is known and details thereof are omitted. The POT method has an advantage that, even when a probability distribution that the right end portion of the measurement data follows is not clear, only Equation (2) is used for the estimation. In addition, since the means for calculating the threshold u is provided, there is an advantage that regions of the end portions are easily defined in the histogram H.

Next, in step S33, the central portion estimating unit 10*a*2 estimates the probability density function $f_C$ in a region equal to and lower than the threshold u. When the probability density function $f_C$ is estimated based on a parametric probability density function for a normal distribution, a logarithmic normal distribution, a Weibull distribution, or the like, a degree of fitting is determined and, for example, a probability distribution for which the AIC (Akaike information criterion) is the smallest is selected. Alternatively, the probability density function may be estimated by the Kernel method since the number of data items in the central portion is large. In this case, the probability density function can be estimated even when the functional form of the probability density function f that the histogram H of the measurement data follows is not clear, differently from the estimation of the parametric probability density function.

Lastly, in step S34, the connecting unit 10*a*3 smoothly connects the probability density function $f_B$ to the probability density function $f_C$ to estimate the probability density function f that fits the entire histogram H. Specifically, after the probability density function $f_J$ of $ax^3+bx^2+cx+d$ that is a cubic function is set in a range of $v \le x < u$ on the left side of the threshold u, the probability density function f that fits the entire histogram H is estimated by assigning the probability density function $f_C$ to $x < v$, assigning the probability density function $f_J$ to $v \le x < u$, and assigning the probability density function $f_B$ to $u \le x$.

In this step S34, five unknown numbers (a, b, c, d, v) need to be defined, but can be calculated according to the following procedure. That is, first, when x=v, the following two requirements need to be satisfied. One of the requirements is that the value of the probability density function $f_C$ is the same as the value of the probability density function $f_J$, and the other requirement is that derivative functions (derivative values) of the two functions are the same value. In addition, when x=u, the following two requirements need to be satisfied. One of the two requirements is that the value of the probability density function $f_B$ is the same as the value of the probability density function $f_J$, and the other requirement is that derivative functions (derivative values) of the two functions are the same value. Furthermore, the following one requirement needs to be satisfied. The one requirement is that the integral of the entire probability density function f is 1. Based on the five requirements, the above-mentioned five unknown numbers (a, b, c, d, v) can be determined.

Needless to say, the method for connecting the probability density function $f_B$ to the probability density function $f_C$ is not limited to the above-mentioned method. When the probability density function $f_S$ for the stress S is to be estimated by the probability density function estimating unit 10*a*, it is desirable to recognize a region in which the probability density function $f_S$ intersects the probability density function $f_R$ for the strength in advance and use a connection method that causes a high degree of fitting in the vicinity of the intersecting region.

<Method for Estimating Failure Probability Due to Fatigue Damage>

Figure 4A:
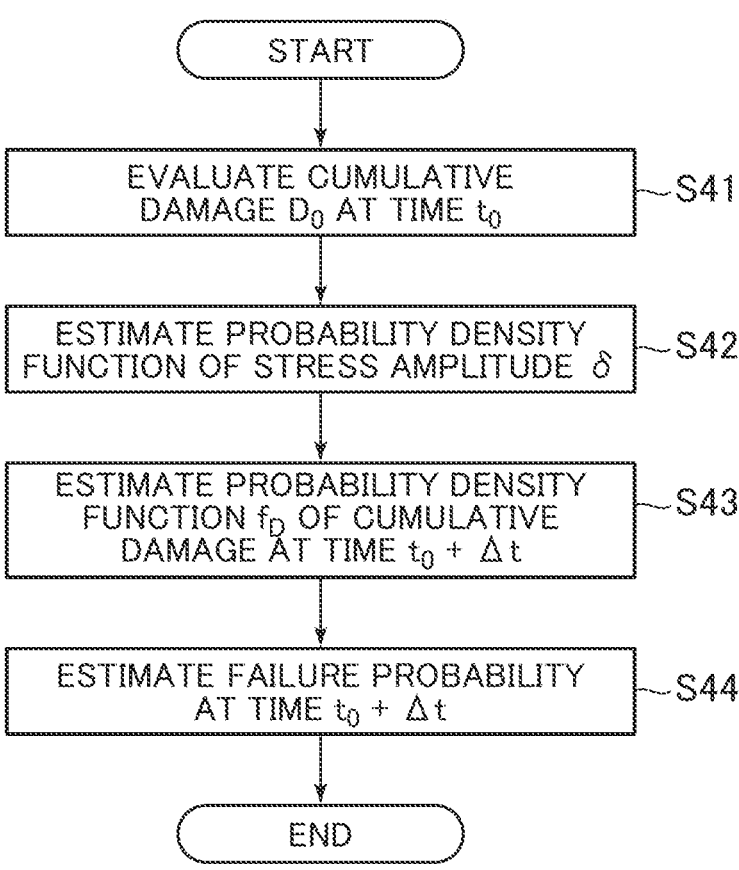
FIG. 4A is a flowchart of the evaluation of a failure probability of fatigue damage by the failure probability evaluation device illustrated in FIG. 1.
Figure 4B:
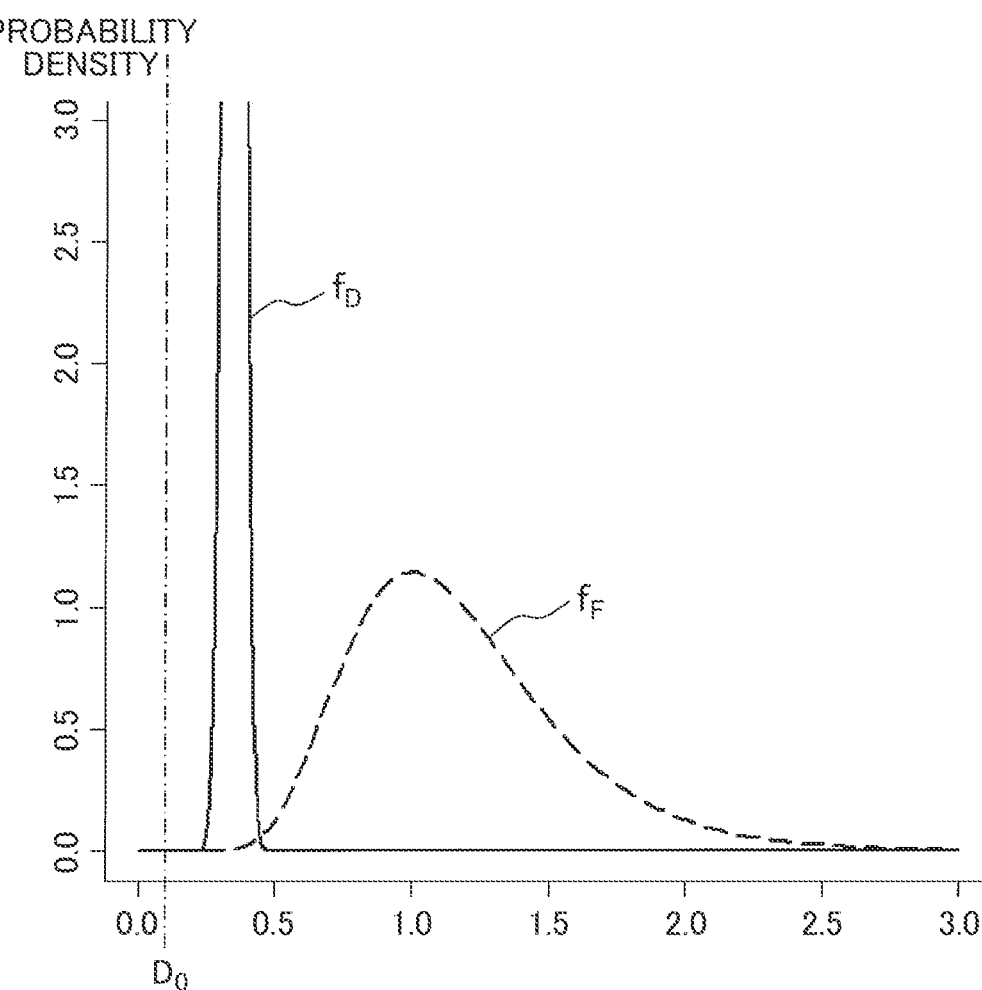
FIG. 4B is a schematic diagram illustrating the relationship between cumulative damage and a probability density function of fatigue strength.

FIG. 4A is a flowchart when the probability of a failure that is not a static failure and is caused by fatigue damage is evaluated by the probability density function estimating unit 10*a* and the failure probability computing unit 10*b* of the failure probability evaluation device 1. In this flowchart, stress amplitude $\delta$ is a first probability variable and cumulative damage D is a second probability variable.

First, in step S41, the storage unit 13 acquires time-series data of the stress S computed by the computing server 4, uses the rainflow method for the data to generate the occurrence frequency distribution 13*c* of the stress amplitude $\delta$, and stores the occurrence frequency distribution 13*c*. In addition, the failure probability computing unit 10*b* uses Miner's law for a material life curve stored in the design/material database 13*b* and the occurrence frequency distribution 13*c* of the stress amplitude $\delta$ to evaluate cumulative damage $D_0$ at time $t_0$.

Next, in step S42, the probability density function estimating unit 10*a* estimates a probability density function $f_\delta$ of the stress amplitude $\delta$ from the occurrence frequency distribution 13*c* of the stress amplitude $\delta$. Since the material life curve follows the power of the stress amplitude $\delta$, damage that occurs once linearly increases in high stress amplitude $\delta$. Therefore, since it is important to accurately estimate the right end portion of the probability density function $f_\delta$ of the stress amplitude $\delta$ in the evaluation of a fatigue damage probability, the probability density function $f_\delta$ of the stress amplitude $\delta$ is estimated by the probability density function estimating unit 10*a*. The method for estimating the probability density function is the same as that described with reference to FIG. 3, and thus a duplicate description is omitted.

In the above description of step S42, the occurrence frequency distribution 13c of the stress amplitude δ is calculated in consideration of the evaluation of a failure probability of a part that is used in a range of elastic deformation and may have high-cycle fatigue. However, the occurrence frequency distribution 13c is not limited to the stress amplitude δ. For example, solder that is used for a joint portion of an electronic part exceeds the range of elastic deformation and is plastically deformed during the use of the electronic part, and thus a material life curve is organized by strain amplitude, not by stress amplitude δ. Therefore, in the evaluation of a failure probability of a member that may have low-cycle fatigue due to plastic deformation, it is desirable to calculate an occurrence frequency distribution of strain amplitude. Needless to say, Miner's law can be used to evaluate the cumulative damage $D_0$ at the time $t_0$ for the occurrence frequency distribution of the strain amplitude.

Next, in step S43, the failure probability computing unit 10b estimates a probability density function $f_D$ of cumulative damage D at time $t_0+\Delta t$, which is any future time. When the stress amplitude δ occurs a number $N_0$ of times before the time $t_0$, and the usage status of the mechanical system 2 is the same, it is considered that the stress amplitude δ occurs a number $N_0 \times \Delta t/t_0$ of times within a time period from the time $t_0$ to the time $t_0+\Delta t$. Therefore, in the failure probability computing unit 10b, when a random variable that follows the probability density function $f_δ$ of the stress amplitude δ calculated in step S42 is generated a number $N_0 \times \Delta t/t_0$ of times, Miner's law is applied to the random variable, and the cumulative damage $D_0$ at the time $t_0$ is added, cumulative damage $D_1$ at the time $t_0+\Delta t$ is obtained. When this process is repeatedly performed, the cumulative damage $D_1$ at the time $t_0+\Delta t$ is a variable value. When the number of times that this process is performed is sufficient, the probability density function $f_D$ of the cumulative damage at the time $t_0+\Delta t$ can be obtained.

Next, in step S44, the failure probability computing unit 10b acquires a probability density function $f_F$ of material fatigue strength stored in the design/material data 13b and compares the probability density function $f_F$ with the probability density function $f_D$ of the cumulative damage at the time $t_0+\Delta t$ that has been acquired in step S43. Since the cumulative damage $D_0$ obtained using Miner's law is compared, the probability density function $f_F$ of the material fatigue strength is given as a probability density function with an average of 1. Since it takes a long time to acquire fatigue strength data and the number of data items is small, it is desirable to estimate a distribution of the fatigue strength based on a single parametric function. It has been experimentally confirmed that the probability density function $f_F$ of the material fatigue strength can be well approximated to a logarithmic normal distribution or a Weibull distribution of three parameters. When they are material fatigue strength $F_R$ and cumulative damage $F_D$ at the time $t_0+\Delta t$, the limit state formula $G=F_R-F_D$. A probability of G<0 is evaluated using the probability density function $f_D$ and the probability density function $f_F$ based on, for example, the Monte Carlo method.

<Display Screen of Display Unit>

Figure 5:
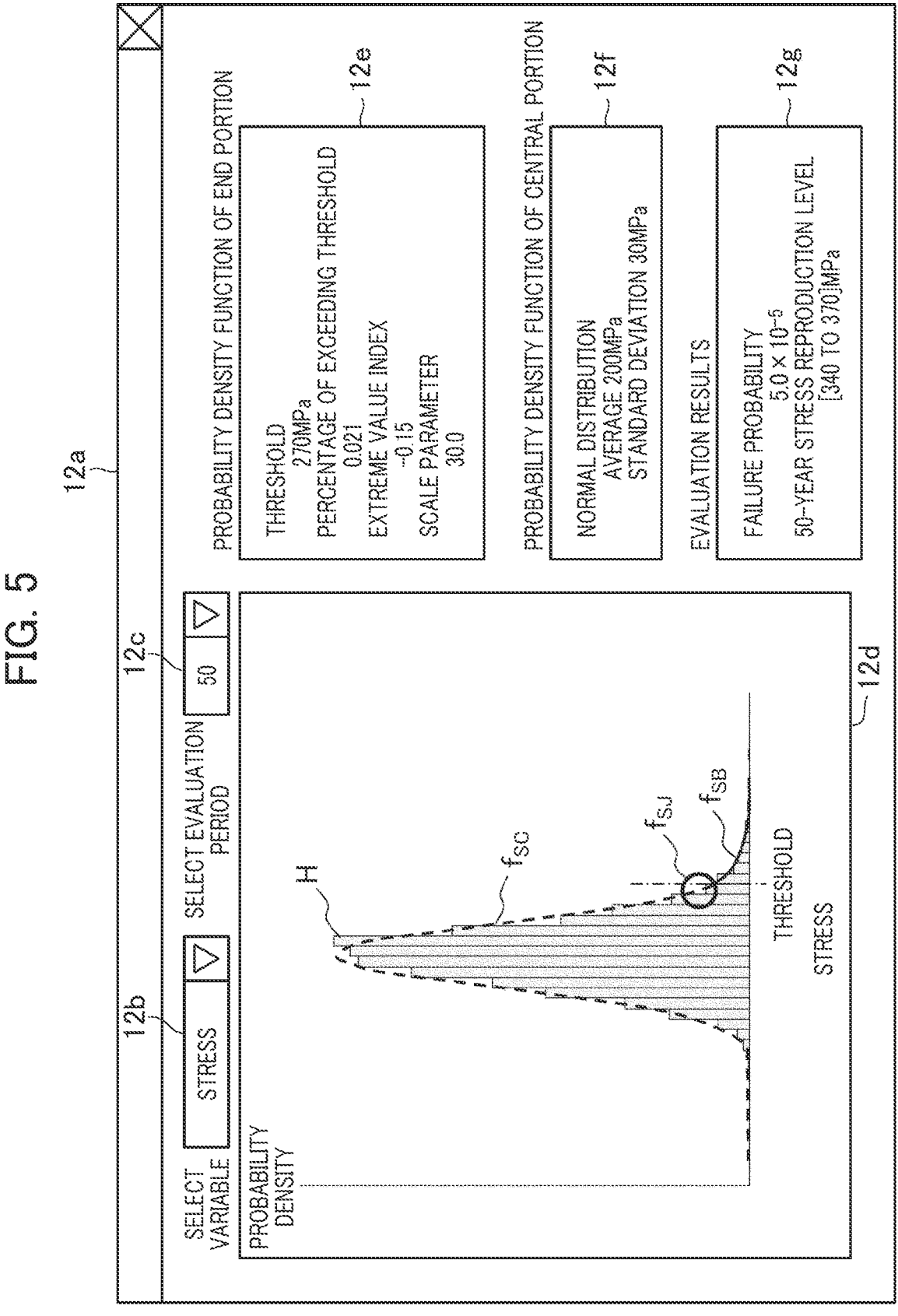
FIG. 5 is a diagram illustrating an example of a display screen of a display device.

FIG. 5 is a diagram illustrating a display screen 12a of the display device constituting the display unit 12 illustrated in FIG. 1. When the user of the failure probability evaluation device 1 selects an objective variable "stress" from a pull-down menu of the variable selection region 12b, the occurrence frequency distribution (histogram H) of the selected variable "stress" and the probability density function $f_S$ of the stress S estimated by the probability density function estimating unit 10a are drawn overlapping each other in a drawing region 12d. In this case, a probability density function $f_{SB}$ of the end portion and a probability density function $f_{SC}$ of the central portion are displayed using different lines. In addition, details of parameters of the probability density functions of the end portion and the central portion are displayed in display regions 12e and 12f. Then, when a future evaluation period (of, for example, 50 years) is selected from a pull-down menu of the evaluation period selection region 12c, the probability of a failure due to a static load, the probability that fatigue damage occurs in the future evaluation period (50 years), a level value (reproduction level) indicating that damage occurs once on average within the future evaluation period (50 years), and the like are displayed in an evaluation result display region 12g. Therefore, the user of the failure probability evaluation device 1 can easily recognize the suitability of a probability density function of a selected variable and the risk of the mechanical system 2.

Confirmation of Effectiveness of Embodiment

Figure 6:
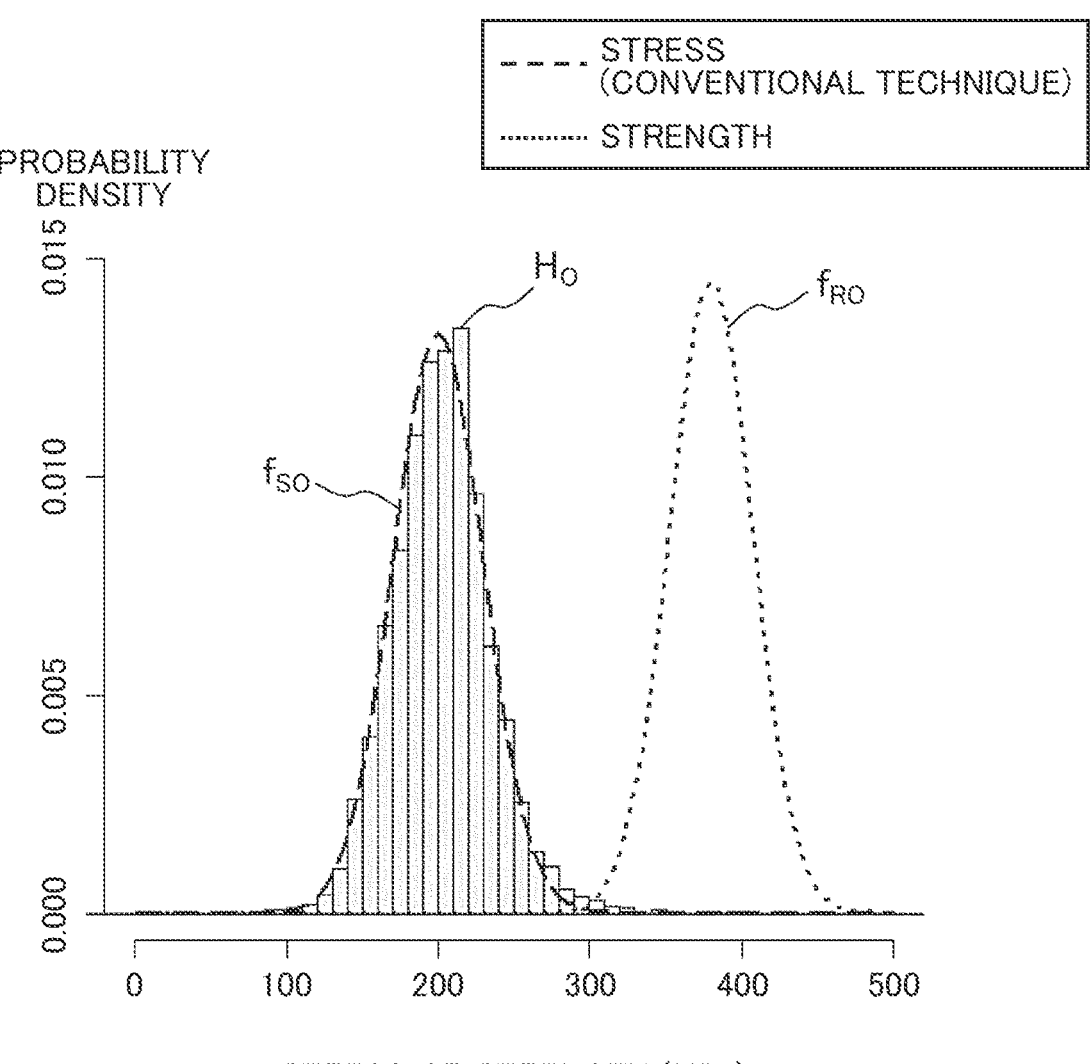
FIG. 6 is a diagram of an occurrence frequency distribution of stress generated in a numerical experiment.
Figure 7:
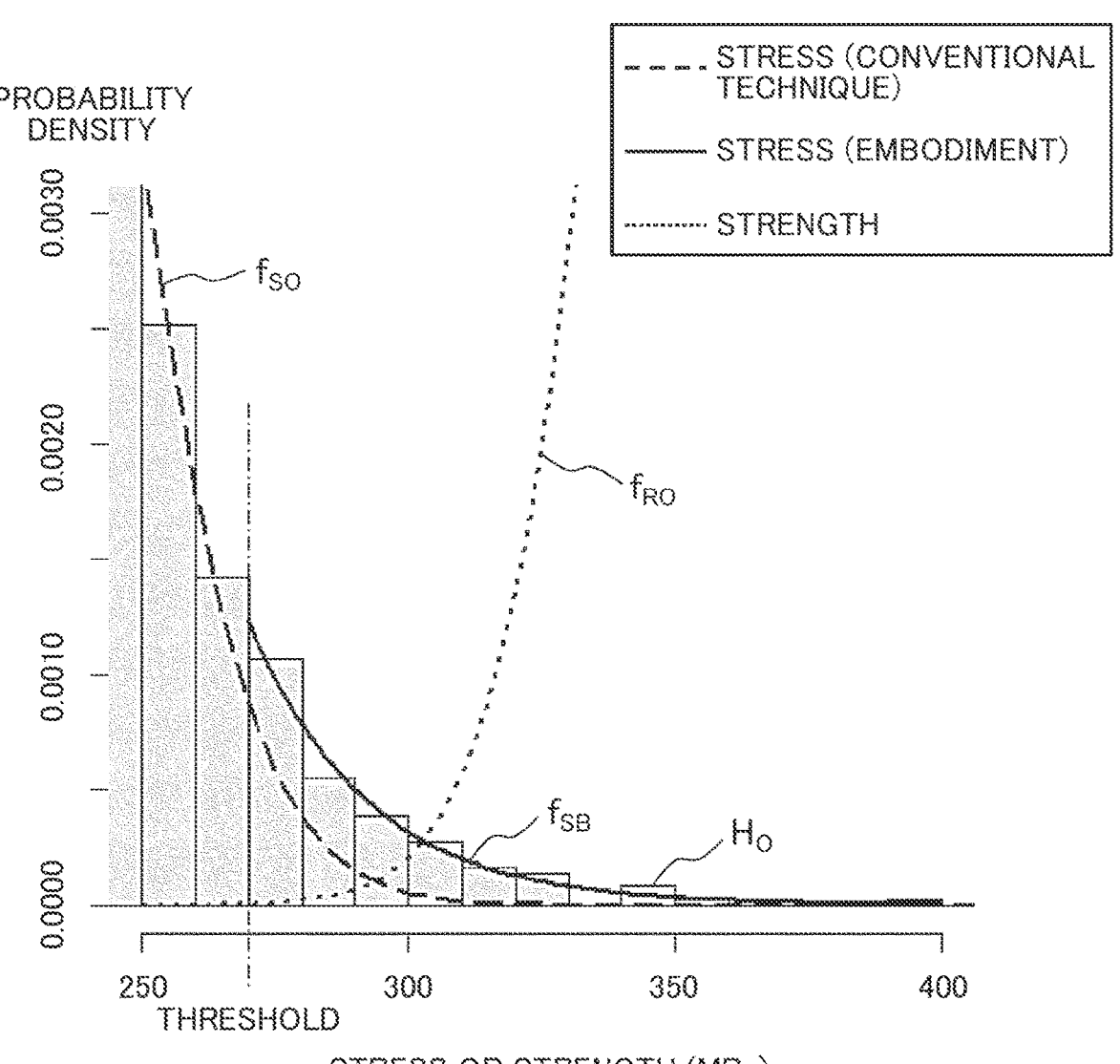
FIG. 7 is a diagram illustrating the shape of a probability density function estimated in the present invention and corresponding to a right end portion of the stress frequency distribution illustrated in FIG. 6.

FIGS. 6 and 7 are diagrams illustrating results of a numerical experiment that indicate effects of the embodiment. A true probability density function $f_S$ of the stress S that is generated in the numerical experiment follows a normal distribution (with an average of 200 MPa and a standard deviation of 30 MPa) in a region lower than 270 MPa, and follows a Weibull distribution (with a scale parameter of 170 MPa and a shape parameter of 2.8) in a region equal to and higher than 270 MPa. Therefore, it is simulated that the right end portion of the probability density function $f_S$ of the stress S is different from the central portion of the probability density function $f_S$ of the stress S. In addition, in this case, a probability density function $f_{RO}$ of strength based on the numeral experiment is a normal distribution (with an average of 380 MPa and a standard deviation of 27.5 MPa).

In FIG. 6, since the reliable mechanical system 2 is simulated, an overlapping region in which the right end portion of the probability function $f_S$ of the stress S overlaps the left end of the probability density function $f_{RO}$ of the strength is small, and this indicates that the mechanical system 2 hardly fails. When Monte Carlo simulation is performed $10^7$ times using the probability density function $f_S$ and the probability density function $f_{RO}$, and the failure probability is calculated from the number of times that the stress S has become higher than the strength, the failure probability when the true probability density function $f_S$ is assumed is $2.05 \times 10^{-4}$.

An occurrence frequency distribution of the stress S when a random number that follows the probability density function $f_S$ is generated 3650 times is a histogram $H_0$ illustrated in FIG. 6. When the entire region of the histogram $H_0$ is estimated by a conventional technique using a single probability density function $f_{S0}$, the most fit function was a normal distribution (with an average of 203 MPa and a standard deviation of 32 MPa) that is a probability distribution that matches the central portion of the occurrence frequency distribution. Therefore, at the right end of the histogram $H_0$, the difference between the histogram $H_0$ following a Weibull distribution and the probability density function $f_{S0}$ following the normal distribution is large.

FIG. 7 is an enlarged view of the right end of the histogram $H_0$ illustrated in FIG. 6. In addition, FIG. 7 illustrates the probability density function $f_{SB}$ estimated by the POT method, which is a type of extreme value statistical model, and overlapping the histogram $H_0$. The probability density function $f_{SB}$ estimated by the POT method well matches the histogram $H_0$ in a region including a region of 340 to 350 MPa where the amount of data is extremely small.

When Monte Carlo simulation is performed $10^7$ times using the three functions, the probability density function $f_{SO}$ based on the conventional technique, the probability density function $f_{SB}$ based on the technique according to the present invention, and the probability density function $f_{RO}$ of the strength, a failure probability estimated by the conventional technique is $1.47 \times 10^{-5}$, and a failure probability estimated by the present invention is $2.41 \times 10^{-4}$. That is, while the failure probability ($2.41 \times 10^{-4}$) estimated in the present embodiment well matches the failure probability ($2.05 \times 10^{-4}$) estimated using the true probability density function $f_s$, the failure probability ($1.47 \times 10^{-5}$) estimated by the conventional technique is an order of magnitude smaller than the true value and is less accurate. Therefore, the effectiveness of the present embodiment with respect to the conventional technique was confirmed.

As described above, according to the present embodiment, even when stress and strength, or a central portion and an end portion of an occurrence frequency distribution of a physical quantity that is, for example, a load and relates to stress and strength do not follow the same probability distribution, the accuracy of evaluating the failure probability can be improved by accurately estimating a probability density function of the end portion.

Although the case where the failure probability of the single mechanical system 2 is evaluated is described as an example in the aforementioned embodiment, this can be applied to the case where a plurality of mechanical systems 2 operate.

In addition, needless to say, when the mechanical system 2 targeted for failure probability evaluation is a newly developed mechanical system, a probability density function estimated for the same type of mechanical system or a similar type of mechanical system can be used as design/material data of the newly developed mechanical system in order to improve the accuracy of evaluating a failure.

In addition, the present invention is not limited to the aforementioned embodiment and includes various modifications. For example, the aforementioned embodiment is described in detail in order to clearly explain the present invention and is not necessarily limited to the device including all the configurations described.

LIST OF REFERENCE SIGNS

1 Failure probability evaluation device, 10 Failure probability evaluating unit, 10a Probability density function estimating unit, 10a1 End portion estimating unit, 10a2 Central portion estimating unit, 10a3 Connecting unit, 10b Failure probability computing unit, 11 Input unit, 12 Display unit, 12a Display screen, 12b Variable selection region, 12c Evaluation period selection region, 12d Probability density function display region of selected variable, 12e Display region of probability density function information of end portion, 12f Display region of probability density function information of central portion, 12g Evaluation result display region, 13 Storage unit, 13a Failure model, 13b Design/material data, 13c Occurrence frequency distribution, 14

Data acquiring unit, 15 Communication I/F, 16 Input I/F, 17 Display I/F, 18 Internal bus, 2 Mechanical system, Design/material database, 4 Computing server, H Occurrence frequency distribution of acquired data, $H_0$ Occurrence frequency distribution generated in numerical experiment, $th_R$, $th_L$, u Threshold, f, $f_S$ Probability density function, $f_B$, $f_{SB}$ Probability density function of end portion, $f_C$, $f_{SC}$ Probability density function of central portion, $f_J$, $f_{SJ}$ Probability density function of portion near connection point, $f_{SO}$ Probability density function of stress estimated by conventional technique, $D_0$ Cumulative damage at time $t_0$, $f_D$ Probability density function of cumulative damage at time $t_0 + \Delta t$, $f_R$ Probability density function of fatigue strength, $f_{RO}$ probability density function of strength based on numerical experiment

The invention claimed is:

1. A failure probability evaluation device that evaluates a failure probability of a mechanical system, comprising one or more memory devices having a program stored thereon that, when executed by one or more processors, cause the one or more processors to:

acquire time-series data of stress and use a rainflow method for the time-series data to generate an occurrence frequency distribution of a probability variable, wherein the probability variable is at least one of a stress amplitude when evaluating high-cycle fatigue within an elastic deformation range of a component of the mechanical system or a strain amplitude when evaluating low-cycle fatigue including plastic deformation of a component of the mechanical system;

store a failure model that computes the failure probability of the mechanical system, and the occurrence frequency distribution of the probability variable to be used for the failure model;

acquire measurement data from one or more sensors of the mechanical system, the measurement data to be used for the failure model;

estimate a probability density function of an end portion of the occurrence frequency distribution based on an extreme value statistical model, estimate a probability density function of a portion other than the end portion of the occurrence frequency distribution, and use the probability density function of the end portion and the probability density function of the portion other than the end portion to estimate an entire probability density function of the occurrence frequency distribution;

compute the failure probability of the mechanical system based on the entire probability density function and the failure model;

display a shape of the entire probability density function of the probability variable and the failure probability;

compute, using a first probability variable, a second probability variable to be used for the failure model, and said second probability variable is stored in the one or more memory devices;

perform a combination of Monte Carlo simulation using a probability density function of the first probability variable and a computation of the second probability variable from the first probability variable to calculate a probability density function of the second probability variable at a point in time when a predetermined time elapses from the time of the computation, and compute the failure probability at a point of time when the predetermined time elapses from the time of the computation; and display at least one of a probability of failure due to a static load, a probability that fatigue damage occurs at the point in time when the predetermined time elapses, or a reproduction level indicating that damage occurs once on average at the point in time when the predetermined time elapses;

wherein the first probability variable indicates the stress amplitude or the strain amplitude, and the second probability variable indicates the stress amplitude or the strain amplitude and cumulative damage computed from a fatigue life curve stored in the one or more memory devices.

2. The failure probability evaluation device according to claim 1, wherein the one or more processors are further configured to estimate the probability density function of the end portion of the occurrence frequency distribution using a general Pareto distribution.

3. The failure probability evaluation device according to claim 2, wherein the one or more processors are further configured to estimate the probability density function of the portion other than the end portion of the occurrence frequency distribution using a kernel method.

4. The failure probability evaluation device according to claim 1, wherein at least one probability variable that is among probability variables to be used for the failure model and is not a probability variable used by the one or more processors to estimate the entire probability density function is given based on a single parametric probability distribution.

5. The failure probability evaluation device according to claim 4, wherein the probability variable used by the one or more processors to estimate the entire probability density function indicates the stress of the mechanical system, and the probability variable given based on the parametric probability distribution indicates strength of the mechanical system.

6. The failure probability evaluation device according to claim 1, wherein the one or more processors are configured to compute the failure probability based on a primary reliability theory or a secondary reliability theory.

7. The failure probability evaluation device according to claim 1, wherein a reproduction level and a parameter of an extreme value model of the entire probability density function estimated by the one or more processors are displayed by the one or more processors.

8. A failure probability evaluation method comprising:
acquiring time-series data of stress and use a rainflow method for the time-series data to generate an occurrence frequency distribution of a probability variable, wherein the probability variable is at least one of a stress amplitude when evaluating high-cycle fatigue within an elastic deformation range of a component of a mechanical system or a strain amplitude when evaluating low-cycle fatigue including plastic deformation of a component of the mechanical system;

storing a failure model that computes a failure probability of the mechanical system, and an occurrence frequency distribution of the probability variable to be used for the failure model;

acquiring measurement data from one or more sensors of the mechanical system, the measurement data to be used for the failure model;

estimating, based on an extreme value model, a probability density function of an end portion of the occurrence frequency distribution that computes the failure probability of the mechanical system;

estimating a probability density function of a portion other than the end portion of the occurrence frequency distribution;

using the probability density function of the end portion and the probability density function of the portion other than the end portion to estimate an entire probability density function of the occurrence frequency distribution;

computing the failure probability of the mechanical system based on the entire probability density function and the failure model;

displaying a shape of the entire probability density function and the failure probability;

using a first probability variable to compute a second probability variable to be used for the failure model stored in one or more memory devices;

performing a combination of Monte Carlo simulation using a probability density function of the first probability variable and a computation of the second probability variable from the first probability variable to calculate a probability density function of the second probability variable at a point in time when a predetermined time elapses from the time of the computation, and computes the failure probability at a point in time when the predetermined time elapses from the time of computation; and displaying at least one of a probability of failure due to a static load, a probability that fatigue damage occurs at the point in time when the predetermined time elapses, or a reproduction level indicating that damage occurs once on average at the point in time when the predetermined time elapses;

wherein the first probability variable indicates the stress amplitude or the strain amplitude, and the second probability variable indicates the stress amplitude or the strain amplitude and cumulative damage computed from a fatigue life curve stored in the one or more memory devices.

* * * * *